United States Patent
Chang (10) Patent No.: US 12,104,717 B2
(45) Date of Patent: Oct. 1, 2024

(54) PIEZOELECTRIC VALVE DRIVER DEVICE

(71) Applicant: ANPEC ELECTRONICS CORPORATION, Hsinchu (TW)

(72) Inventor: Ming-Hung Chang, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 195 days.

(21) Appl. No.: 18/071,758

(22) Filed: Nov. 30, 2022

(65) Prior Publication Data

US 2024/0093805 A1 Mar. 21, 2024

(30) Foreign Application Priority Data

Sep. 21, 2022 (TW) .................................. 111135649

(51) Int. Cl.
*F16K 99/00* (2006.01)
(52) U.S. Cl.
CPC ................ *F16K 99/0048* (2013.01)
(58) Field of Classification Search
CPC ........ F02D 41/2096; F02D 2041/2051; H10N 30/802; H10N 30/00; H10N 30/80; F16K 31/004; F16K 99/0048; F16K 99/0001; F16K 99/0015; H02N 2/14; H02N 2/00
See application file for complete search history.

(56) References Cited

U.S. PATENT DOCUMENTS

2009/0038590 A1* 2/2009 Fukushima ......... F02D 41/2096
310/314

* cited by examiner

*Primary Examiner* — Antony M Paul
(74) *Attorney, Agent, or Firm* — Li & Cai Intellectual Property (USA) Office (57) ABSTRACT

A piezoelectric valve driver device is provided. A first driver is connected to a first side of a valve. A second driver is connected to a second side of the valve. A power charging circuit is coupled between an external power source and a second voltage. A charging and discharging current controller is connected to the first driver, the second driver and the power charging circuit, and is configured to control currents of the first driver, the second driver and the power charging circuit. When a driver circuit switches the valve from a closed state to an open state, the first driver provides a first voltage to the first side of the valve, and the second voltage that is outputted to the second side of the valve by the second driver is discharged to output a discharging current to the external power source through the power charging circuit.

17 Claims, 5 Drawing Sheets

PIEZOELECTRIC VALVE DRIVER DEVICE

CROSS-REFERENCE TO RELATED PATENT APPLICATION

This application claims the benefit of priority to Taiwan Patent Application No. 111135649, filed on Sep. 21, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a driver device, and more particularly to a piezoelectric valve driver device.

BACKGROUND OF THE DISCLOSURE

A micro-electromechanical valve is made of a piezoelectric material and thus has an inverse piezoelectric effect. When a voltage is applied to the micro-electromechanical valve, an electric dipole moment is lengthened, and the piezoelectric material is stretched along a direction of an electric field against a change in the electric dipole moment. As a result, electrical energy of the voltage applied to the micro-electromechanical valve is converted into mechanical energy for opening or closing the micro-electromechanical valve. The micro-electromechanical valve may be applied to a wearable device and may be controlled as a pressure relief valve of a speaker having a resonant cavity. When the micro-electromechanical valve of the speaker is in an open state, an air pressure inside ears of a user wearing the wearable device is balanced with an air pressure outside the ears of the user, such that ambient sounds can be heard by the ears of the user. Under this condition, sound pressure generated by the speaker is reduced such that sound volume of the speaker is degraded at a low frequency. Conversely, when the micro-electromechanical valve is in a closed state, the ambient sounds including ambient noise is blocked from the ears of the user and the sound pressure generated by the speaker increases at the low frequency. Therefore, the micro-electromechanical valve must be switched according to sound requirements of the user, thereby preventing unwanted noise from reaching the ears of the user. In addition, if the micro-electromechanical valve is applied to the wearable device, the micro-electromechanical valve must be able to be switched under the condition that little power is consumed.

SUMMARY OF THE DISCLOSURE

In response to the above-referenced technical inadequacies, the present disclosure provides a piezoelectric valve driver device. The piezoelectric valve driver device includes a driver circuit, a power charging circuit, and a charging and discharging current controller. The driver circuit includes a first driver and a second driver. The first driver is connected to a first side of a valve. The first driver is configured to output a first voltage to the first side of the valve to drive the first side of the valve. The second driver is connected to a second side of the valve. The second driver is configured to output a second voltage to the second side of the valve to drive the second side of the valve. The power charging circuit is coupled between an external power source and the second voltage. The charging and discharging current controller is connected to the first driver, the second driver and the power charging circuit. The charging and discharging current controller is configured to control currents of the first driver, the second driver and the power charging circuit. When the driver circuit switches the valve from a closed state to an open state, the first driver provides the first voltage to the first side of the valve, the second voltage that is outputted to the second side of the valve by the second driver is discharged to output a discharging current to the power charging circuit, and then the power charging circuit provides the discharging current to the external power source.

In certain embodiments, the first driver is connected to the external power source. When the driver circuit switches the valve from the closed state to the open state, the first driver provides the first voltage to the first side of the valve by using a voltage from the external power source.

In certain embodiments, when the driver circuit switches the valve from the closed state to the open state and a voltage of the external power source is lower than the second voltage, the power charging circuit allows the discharging current being generated by discharging the second voltage that is outputted to the second side of the valve by the second driver to flow to the external power source.

In certain embodiments, when the driver circuit switches the valve from the closed state to the open state and the voltage of the external power source is higher than the second voltage, the discharging current being generated by discharging the second voltage that is outputted to the second side of the valve by the second driver flows to a reference voltage level.

In certain embodiments, when the valve is in the closed state, the first voltage that is outputted to the first side of the valve by the first driver is equal to the second voltage that is outputted to the second side of the valve by the second driver.

In certain embodiments, the first driver includes a voltage modulator circuit. The voltage modulator circuit is connected to the first side of the valve, the charging and discharging current controller and the external power source. When the driver circuit switches the valve from the closed state to the open state, the voltage modulator circuit increases the first voltage that is outputted to the first side of the valve by the first driver by using a voltage from the external power source. When the driver circuit switches the valve from the open state to the closed state, the voltage modulator circuit decreases the first voltage that is outputted to the first side of the valve by the first driver.

In certain embodiments, the power charging circuit includes a switch component. A first terminal of the switch component is coupled to the second voltage. A second terminal of the switch component is connected to the external power source. A control terminal of the switch component is connected to the charging and discharging current controller. When the driver circuit switches the valve from the closed state to the open state, the discharging current being generated by discharging the second voltage that is outputted to the second side of the valve by the second driver flows to the external power source through the switch component being turned on.

In certain embodiments, the power charging circuit further includes a diode. The diode is connected between the switch component and the external power source. An anode of the diode is connected to the second terminal of the switch component. A cathode of the diode is connected to the external power source. When the driver circuit switches the valve from the closed state to the open state, the discharging current being generated by discharging the second voltage that is outputted to the second side of the valve by the second driver flows sequentially through the switch component being turned on and the diode to the external power source.

In certain embodiments, when the valve is in the open state, the first voltage that is outputted to the first side of the valve by the first driver is higher than the second voltage that is outputted to the second side of the valve by the second driver.

In certain embodiments, the first voltage of the first side of the valve in the open state is higher than the first voltage of the first side of the valve in the closed state.

In certain embodiments, the second voltage of the second side of the valve in the open state is lower than the second voltage of the second side of the valve in the closed state.

In certain embodiments, when the valve is in the open state, the second voltage of the second side of the valve is equal to a zero vale.

In certain embodiments, the second driver is coupled to the first voltage. When the driver circuit switches the valve from the open state to the closed state, the first voltage that is outputted to the first side of the valve by the first driver is discharged to output a discharging current to the second driver, and then the second driver provides the second voltage to the second side of the valve by using the discharging current of the first voltage.

In certain embodiments, the second driver includes a first driving switch and a second driving switch. A first terminal of the first driving switch is coupled to the first voltage. A control terminal of the first driving switch is connected to the charging and discharging current controller. A first terminal of the second driving switch is connected to a second terminal of the first driving switch. A node between the first terminal of the second driving switch and the second terminal of the first driving switch is connected to the second side of the valve. A second terminal of the second driving switch is coupled to a reference voltage. A control terminal of the second driving switch is connected to the charging and discharging current controller. When the driver circuit switches the valve from the closed state to the open state, the discharging current being generated by discharging the second voltage that is outputted to the second side of the valve by the second driver flows to a reference voltage level through the second driving switch that is turned on, or flows to the external power source through the power charging circuit but not the second driving switch that is turned off.

In certain embodiments, when the driver circuit switches the valve from the open state to the closed state, a discharging current being generated by discharging the first voltage that is outputted to the first side of the valve by the first driver flows to the second side of the valve through the first driving switch being turned on.

In certain embodiments, when the valve is in the closed state, the first driving switch of the second driver is turned on such that the first voltage is equal to the second voltage, and a voltage modulator circuit included by the first driver adjusts each of the first voltage and the second voltage to be equal to a central voltage.

In certain embodiments, the charging and discharging current controller controls currents of the first driver, the second driver and the power charging device to control rising rates and falling rates of both of the first voltage and the second voltage so as to control a switching rate of the valve.

As described above, the present disclosure provides the piezoelectric valve driver device. When the piezoelectric valve driver device of the present disclosure switches the valve from the closed state to the open state, the second voltage that is outputted to the second side of the valve by the second driver can be discharged to output the discharging current to the power charging circuit instead of the zero voltage level. In particular, the power charging circuit of the piezoelectric valve driver device of the present disclosure is able to appropriately provide the discharging current to the external power source to charge the external power source, thereby saving power consumption. Furthermore, the piezoelectric valve driver device of the present disclosure is able to appropriately control the rising and falling rates of both of the first voltage that is outputted to the first side of the valve by the first driver and the second voltage that is outputted to the second side of the valve by the second driver.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
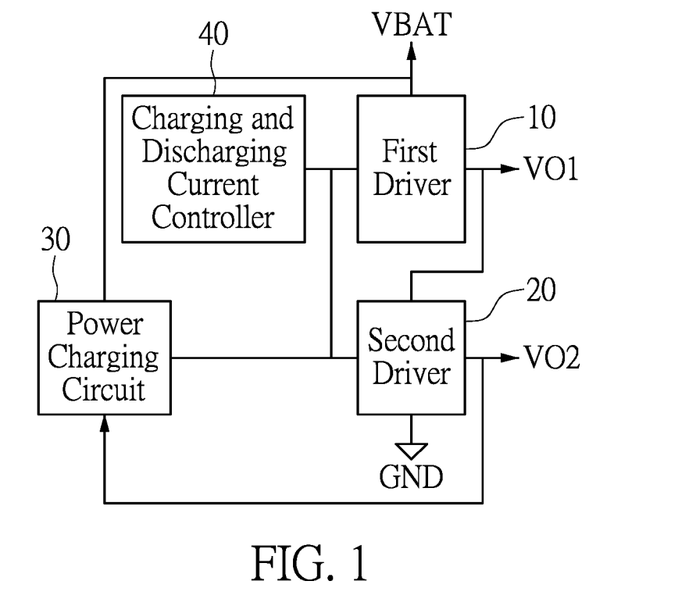
FIG. 1 is a block diagram of a piezoelectric valve driver device of an embodiment of the present disclosure.
Figure 2:
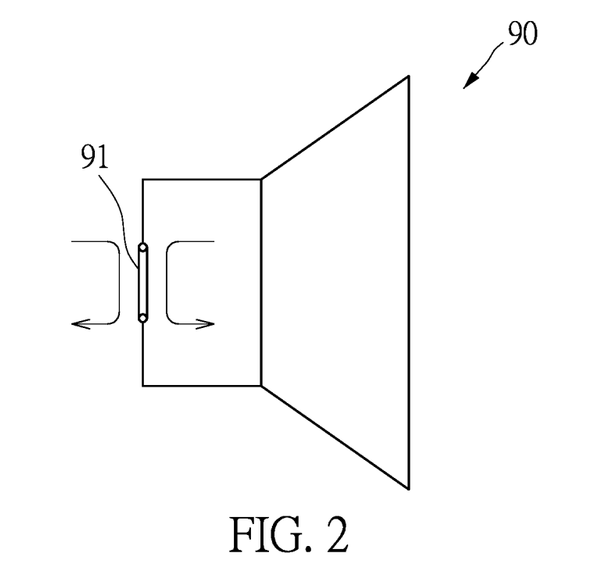
FIG. 2 is a schematic diagram of a valve of a speaker that is switched to a closed state by the piezoelectric valve driver device of the embodiment of the present disclosure.
Figure 3:
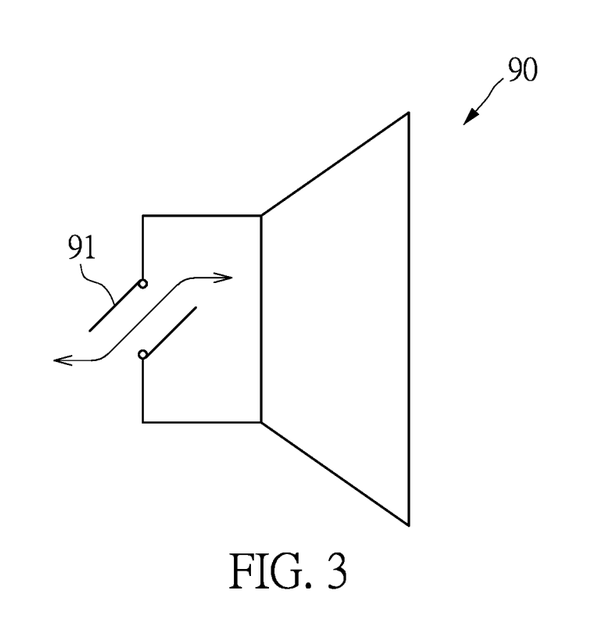
FIG. 3 is a schematic diagram of the valve of the speaker that is switched to an open state by the piezoelectric valve driver device of the embodiment of the present disclosure.

Reference is made to FIGS. 1 to 3, in which FIG. 1 is a block diagram of a piezoelectric valve driver device of an embodiment of the present disclosure, FIG. 2 is a schematic diagram of a valve of a speaker that is switched to a closed state by the piezoelectric valve driver device of the embodiment of the present disclosure, and FIG. 3 is a schematic diagram of the valve of the speaker that is switched to an open state by the piezoelectric valve driver device of the embodiment of the present disclosure.

As shown in FIG. 1, the piezoelectric valve driver device of the embodiment of the present disclosure may include a power charging circuit 30, a charging and discharging current controller 40, and a driver circuit. The driver circuit may include a first driver 10 and a second driver 20. The piezoelectric valve driver device of the embodiment of the present disclosure is applicable to a valve of an electronic device such as, but not limited to, a valve 91 of a speaker 90 of a BLUETOOTH headset as shown in FIGS. 2 and 3.

A first terminal of the first driver 10 may be connected to an external power source such as, but not limited to, a battery. That is, the first terminal of the first driver 10 may be coupled to the voltage of the external power source. The voltage of the external power source is represented by a power source voltage VBAT as shown in FIG. 1. A second terminal of the first driver 10 is connected to a first side of the valve 91.

A first terminal of the second driver 20 may be coupled to a first voltage VO1, or may be connected to the second terminal of the first driver 10 (or the first side of the valve 91). A second terminal of the second driver 20 is connected to a second terminal of the valve 91.

A third terminal of the second driver 20 may be coupled to a reference voltage level GND such as a zero voltage level. The second terminal of the second driver 20 or the second side of the valve 91 may be coupled to the reference voltage level GND such as the zero voltage level through the third terminal of the second driver 20.

The power charging circuit 30 is coupled between the second voltage VO2 and the external power source. A first terminal of the power charging circuit 30 is coupled to the second voltage VO2. A second terminal of the power charging circuit 30 is connected to the external power source. That is, the second terminal of the power charging circuit 30 may be coupled to the power source voltage VBAT of the external power source such as, but not limited to, the battery.

The charging and discharging current controller 40 may be connected to the first driver 10, the second driver 20 and the power charging circuit 30. The charging and discharging current controller 40 may control (discharging currents and charging currents included in) currents of the first driver 10, the second driver 20 and the power charging circuit 30 as described in the following.

The first driver 10 is configured to output the first voltage VO1 to the first side of the valve 91 to drive the first side of the valve 91. The second driver 20 is configured to output the second voltage VO2 to the second side of the valve 91 to drive the second side of the valve 91.

It is worth noting that, when the driver circuit drives the valve 91 from the closed state as shown in FIG. 2 to the open state as shown in FIG. 3, the first driver 10 may pull up the first voltage VO1 outputted to the first side of the valve 91 (by using the power source voltage VBAT of the external power source). At the same time, the second voltage VO2 that is outputted to the second side of the valve 91 from the second terminal of the second driver 20 may be discharged to output a discharging current to the power charging circuit 30. The power charging circuit 30 may provide the discharging current to the external power source to charge the external power source such that the power source voltage VBAT of the external power source, such as the battery, increases.

If necessary, the power charging circuit 30 may, according to the power source voltage VBAT of the external power source such as the battery, determine whether or not the discharging current generated by discharging the second voltage VO2 that is outputted to the second side of the valve 91 by the second driver 20 is provided to the external power source.

For example, when the power charging circuit 30 determines that the driver circuit switches the valve 91 from the closed state as shown in FIG. 2 to the open state as shown in FIG. 3 and the power source voltage VBAT of the external power source is lower than the second voltage VO2, the power charging circuit 30 allows the discharging current of the second voltage VO2 to follow to the external power source.

When the power charging circuit 30 determines that the driver circuit switches the valve 91 from the closed state as shown in FIG. 2 to the open state as shown in FIG. 3 and the power source voltage VBAT of the external power source is higher than the second voltage VO2, the power charging circuit 30 does not allow the discharging current of the second voltage VO2 to flow to the external power source. Under this condition, the discharging current of the second voltage VO2 flows directly to the reference voltage level GND such as the zero voltage level (through the second driver 20) to discharge the second voltage VO2. As a result, the second voltage VO2 that is outputted to the second side of the valve 91 from the second terminal of the second driver 20 is gradually decreased.

Conversely, when the power charging circuit 30 determines that the driver circuit switches the valve 91 from the open state as shown in FIG. 3 to the closed state as shown in FIG. 2, the first voltage VO1 that is outputted to the first side of the valve 91 by the first driver 10 is discharged to output a discharging current to the second driver 20. Then, the second driver 20 may provide the second voltage VO2 to the second side of the valve 91 by using the discharging current of the first voltage VO1.

Figure 4:
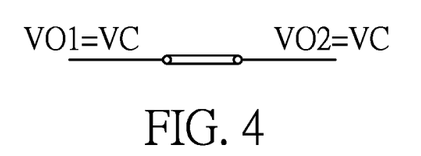
FIG. 4 is a schematic diagram of voltages of the valve of the speaker that is switched to the closed state by the piezoelectric valve driver device of the embodiment of the present disclosure.
Figure 5:
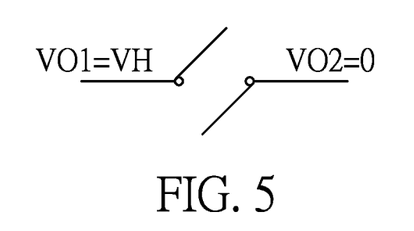
FIG. 5 is a schematic diagram of the voltages of the valve of the speaker that is switched to the open state by the piezoelectric valve driver device of the embodiment of the present disclosure.
Figure 6:
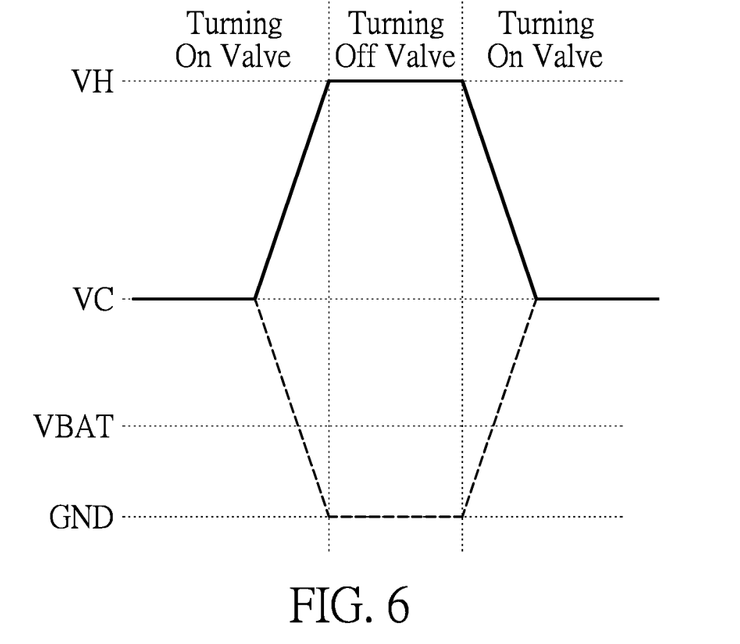
FIG. 6 is a schematic diagram of changes in the voltages of the valve of the speaker that is switched between the closed state and the open state by the piezoelectric valve driver device of the embodiment of the present disclosure.

Reference is made to FIGS. 1 to 6, in which FIG. 4 is a schematic diagram of voltages of the valve of the speaker that is switched to the closed state by the piezoelectric valve driver device of the embodiment of the present disclosure, FIG. 5 is a schematic diagram of the voltages of the valve of the speaker that is switched to the open state by the piezoelectric valve driver device of the embodiment of the present disclosure, and FIG. 6 is a schematic diagram of changes in the voltages of the valve of the speaker that is switched between the closed state and the open state by the piezoelectric valve driver device of the embodiment of the present disclosure.

When the first voltage VO1 that is outputted to the first side of the valve 91 by the first driver 10 is equal to the second voltage VO2 that is outputted to the second side of the valve 91 by the second driver 20, the valve 91 is in the closed state. For example, both of the first voltage VO1 and the second voltage VO2 are equal to a central voltage VC as shown in FIGS. 4 and 6.

As shown in FIGS. 4 and 6, when the first voltage VO1 that is outputted to the first side of the valve 91 by the first driver 10 gradually increases from the central voltage VC to a preset high driving voltage VH, and the second voltage VO2 that is outputted to the second side of the valve 91 by the second driver 20 gradually decreases from the central voltage VC to the reference voltage level GND such as the zero voltage level, the valve 91 is switched from the closed state to the open state.

When the valve 91 is the open state, the first voltage VO1 that is outputted to the first side of the valve 91 by the first driver 10 is higher than the second voltage VO2 that is outputted to the second side of the valve 91 by the second driver 20.

It is worth noting that, as shown in FIG. 6, when the valve 91 is switched from the closed state to the open state, the second voltage VO2 that is outputted to the second side of the valve 91 by the second driver 20 is discharged to the external power source. Then, when the second voltage VO2 is discharged to be lower than the power source voltage VBAT of the external power source, the second voltage VO2 stops being discharged to the external power source and starts being discharged to the reference voltage level GND such as the zero voltage level or a ground.

As shown in FIGS. 4 and 6, when the first voltage VO1 that is outputted to the first side of the valve 91 by the first driver 10 gradually decreases from the preset high driving voltage VH to the central voltage VC, and the second voltage VO2 that is outputted to the second side of the valve 91 by the second driver 20 gradually increases from the reference voltage level GND, such as the zero voltage level, to the central voltage VC, the valve 91 is switched from the open state to the closed state.

As shown in FIG. 6, the first voltage VO1 of the first side of the valve 91 in the open state is equal to the preset high driving voltage VH and higher than the first voltage VO1 of the first side of the valve 91 in the closed state such as the central voltage VC. The second voltage VO2 of the second side of the valve 91 in the open state such as the zero voltage level is lower than the second voltage VO2 of the second side of the valve 91 in the closed state such as the central voltage VC.

For example, one half of a sum of the first voltage VO1 of the first side of the valve 91 in the open state and the second voltage VO2 of the second side of the valve 91 in the open state, such as the central voltage VC, may be equal to the first voltage VO1 of the first side of the valve 91 in the closed state, and may also be equal to the second voltage VO2 of the second side of the valve 91 in the closed state, but the present disclose is not limited thereto.

Figure 7:
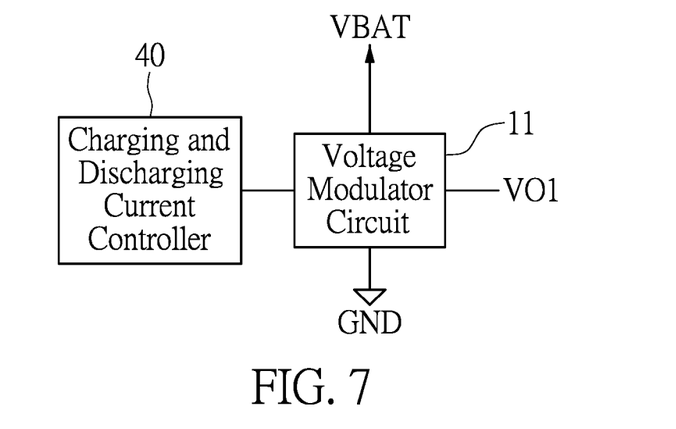
FIG. 7 is a block diagram of a first driver and a charging and discharging current controller of the piezoelectric valve driver device of the embodiment of the present disclosure.

Reference is made to FIGS. 1 and 7, in which FIG. 7 is a block diagram of a first driver and a charging and discharging current controller of the piezoelectric valve driver device of the embodiment of the present disclosure.

For example, the first driver 10 shown in FIG. 1 may include a voltage modulator circuit 11 shown in FIG. 7, but the present disclose is not limited thereto.

A first terminal of the voltage modulator circuit 11 shown in FIG. 7 may be connected to the external power source. That is, the first terminal of the voltage modulator circuit 11 of the first driver 10 as shown in FIG. 7 may be coupled to the power source voltage VBAT of the external power source such as the battery as shown in FIGS. 1 and 7. A second terminal of the voltage modulator circuit 11 as shown in FIG. 7 may be connected to a first side of a valve (such as, but not limited to, the first side of the valve 91 of the speaker as shown in FIG. 2). A third terminal of the voltage modulator circuit 11 may be connected to the charging and discharging current controller 40. If necessary, as shown in FIG. 7, a fourth terminal of the voltage modulator circuit 11 may be coupled to the reference voltage level GND, such as the zero voltage level.

When the driver circuit switches the valve from the closed state to the open state, the voltage modulator circuit 11 may increase the first voltage VO1 that is outputted to the first side of the valve by the first driver 10 (by using the power source voltage VBAT of the external power source). For example, as shown in FIGS. 4 and 5, the voltage modulator circuit 11 may increase the first voltage VO1 from the central voltage VC to the preset high driving voltage VH. The voltage modulator circuit 11 may also control a rising slope of the first voltage VO1.

Conversely, when the driver circuit switches the valve from the open state to the closed state, the voltage modulator circuit 11 may decrease the first voltage VO1 that is outputted to the first side of the valve from the second terminal of the first driver 10. For example, the voltage modulator circuit 11 may decrease the first voltage VO1 from the preset high driving voltage VH to the central voltage VC. The voltage modulator circuit 11 may also control a falling slope of the first voltage VO1. For example, the voltage modulator circuit 11 may discharge the first voltage VO1 of the first side of the valve to the second driver 20 as shown in FIG. 1 (and/or to the reference voltage level GND such as the zero voltage level as shown in FIG. 7) to decrease the first voltage VO1 of the first side of the valve.

Figure 8:
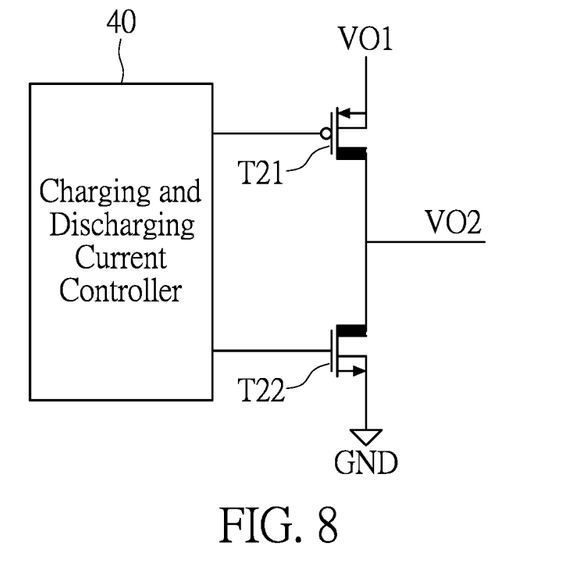
FIG. 8 is a circuit diagram of a second driver and the charging and discharging current controller of the piezoelectric valve driver device of the embodiment of the present disclosure.

Reference is made to FIGS. 1 and 8, in which FIG. 8 is a circuit diagram of a second driver and the charging and discharging current controller of the piezoelectric valve driver device of the embodiment of the present disclosure.

For example, the second driver 20 shown in FIG. 1 may include a first driving switch T21 and a second driving switch T22 that may be transistors as shown in FIG. 8, but the present disclosure is not limited thereto.

A first terminal of the first driving switch T21 shown in FIG. 8 is connected to the first voltage VO1 shown in FIGS. 1 and 8. A second terminal of the first driving switch T21 is connected to a first terminal of the second driving switch T22.

A node between the second terminal of the first driving switch T21 and the first terminal of the second driving switch T22 is connected to a second side of the valve (such as, but not limited to, the second side of the valve 91 as shown in FIG. 2). A second terminal of the second driving switch T22 shown in FIG. 8 is coupled to the reference voltage level GND, such as the zero voltage level as shown in FIGS. 1 and 8.

If necessary, a control terminal of the first driving switch T21 and a control terminal of the second driving switch T22 may be connected to the charging and discharging current controller 40. The charging and discharging current controller 40 may control operations of the first driving switch T21 and the second driving switch T22. For example, the charging and discharging current controller 40 may turn on or off the first driving switch T21 and the second driving switch T22 and control currents through the first driving switch T21 and the second driving switch T22.

When the driver circuit switches the valve from the closed state to the open state and the power source voltage VBAT of the external power source may be charged to be higher than the second voltage VO2, the discharging current generated by discharging the second voltage VO2 that is outputted to the second side of the valve from the second terminal of the second driver 20 flows to the reference voltage level GND such as the zero voltage level through the second driving switch T22 being turned on.

It is worth noting that, when the driver circuit switches the valve from the closed state to the open state and the power source voltage VBAT of the external power source is lower than the second voltage VO2, the discharging current generated by discharging the second voltage VO2 that is outputted to the second side of the valve from the second terminal of the second driver 20 flows through the power charging circuit 30 to the external power source but not the second driving switch T22 being turned off. As a result, the external power source is charged by the discharging current of the second voltage VO2 such that the power source voltage VBAT of the external power source such as the battery increases.

Conversely, when the driver circuit switches the valve from the open state to the closed state, the first voltage VO1 that is outputted to the first side of the valve by the first driver 10 is discharged to output the discharging current to the second side of the valve through the first driving switch T21 being turned on.

Figure 9:
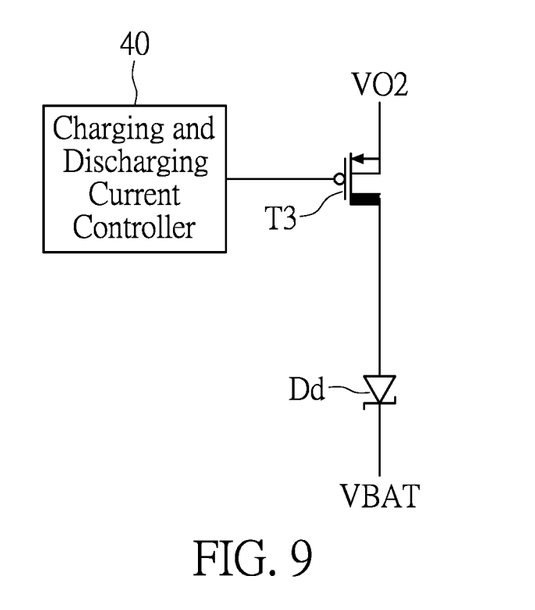
FIG. 9 is a circuit diagram of a power charging circuit and the charging and discharging current controller of the piezoelectric valve driver device of the embodiment of the present disclosure.

Reference is made to FIGS. 1 and 9, in which FIG. 9 is a circuit diagram of a power charging circuit and the charging and discharging current controller of the piezoelectric valve driver device of the embodiment of the present disclosure.

For example, the power charging circuit 30 shown in FIG. 1 may include one of both of a switch component T3 and a diode Dd as shown in FIG. 9, but the present disclosure is not limited thereto.

A first terminal of the switch component T3 shown in FIG. 9 may be coupled to the second voltage VO2 shown in FIGS. 1 and 9. A control terminal of the switch component T3 may be connected to the charging and discharging current controller 40. The charging and discharging current controller 40 may control operation of the switch component T3. For example, the charging and discharging current controller 40 may turn on or off the switch component T3 and control a current flowing through the switch component T3.

The diode Dd may be connected between the switch component T3 and the external power source. An anode of the diode Dd may be connected to a second terminal of the switch component T3. A cathode of the diode Dd may be connected to the external power source. That is, the cathode of the diode Dd may be coupled to the power source voltage VBAT of the external power source, such as the battery.

When the driver circuit switches the valve from the closed state to the open state (and the power source voltage VBAT of the external power source is lower than the second voltage VO2), the discharging current generated by discharging the second voltage VO2 that is outputted to the second side of the valve by the second driver 20 flows to the external power source sequentially through the switch component T3 being turned on and the diode Dd. As a result, the power source voltage VBAT of the external power source, such as the battery, increases.

In conclusion, the present disclosure provides the piezoelectric valve driver device. When the piezoelectric valve driver device of the present disclosure switches the valve from the closed state to the open state, the second voltage that is outputted to the second side of the valve by the second driver can be discharged to output the discharging current to the power charging circuit instead of the zero voltage level. In particular, the power charging circuit of the piezoelectric valve driver device of the present disclosure is able to appropriately provide the discharging current to the external power source to charge the external power source, thereby saving power consumption. Furthermore, the piezoelectric valve driver device of the present disclosure is able to appropriately control the rising and falling rates of both of the first voltage that is outputted to the first side of the valve by the first driver and the second voltage that is outputted to the second side of the valve by the second driver.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A piezoelectric valve driver device, comprising:
    a driver circuit, including:
        a first driver connected to a first side of a valve, and configured to output a first voltage to the first side of the valve to drive the first side of the valve; and
        a second driver connected to a second side of the valve, and configured to output a second voltage to the second side of the valve to drive the second side of the valve; and
    a power charging circuit coupled between an external power source and the second voltage;
    a charging and discharging current controller connected to the first driver, the second driver and the power charging circuit, and configured to control currents of the first driver, the second driver and the power charging circuit;
    wherein, when the driver circuit switches the valve from a closed state to an open state, the first driver provides the first voltage to the first side of the valve, the second voltage that is outputted to the second side of the valve by the second driver is discharged to output a discharging current to the power charging circuit, and the power charging circuit provides the discharging current to the external power source.

2. The piezoelectric valve driver device according to claim 1, wherein the first driver is connected to the external power source, and when the driver circuit switches the valve from the closed state to the open state, the first driver provides the first voltage to the first side of the valve by using a voltage from the external power source.

3. The piezoelectric valve driver device according to claim 1, wherein, when the driver circuit switches the valve from the closed state to the open state and a voltage of the external power source is lower than the second voltage, the power charging circuit allows the discharging current, which is generated by discharging the second voltage that is outputted to the second side of the valve by the second driver, to flow to the external power source.

4. The piezoelectric valve driver device according to claim 3, wherein, when the driver circuit switches the valve from the closed state to the open state and the voltage of the external power source is higher than the second voltage, the discharging current being generated by discharging the second voltage that is outputted to the second side of the valve by the second driver flows to a reference voltage level.

5. The piezoelectric valve driver device according to claim 1, wherein, when the valve is in the closed state, the first voltage that is outputted to the first side of the valve by the first driver is equal to the second voltage that is outputted to the second side of the valve by the second driver.

6. The piezoelectric valve driver device according to claim 1, wherein the first driver includes a voltage modulator circuit connected to the first side of the valve, the charging and discharging current controller and the external power source;
wherein, when the driver circuit switches the valve from the closed state to the open state, the voltage modulator circuit increases the first voltage that is outputted to the first side of the valve by the first driver by using a voltage from the external power source;
wherein, when the driver circuit switches the valve from the open state to the closed state, the voltage modulator circuit decreases the first voltage that is outputted to the first side of the valve by the first driver.

7. The piezoelectric valve driver device according to claim 1, wherein the power charging circuit includes a switch component, a first terminal of the switch component is coupled to the second voltage, a second terminal of the switch component is connected to the external power source, and a control terminal of the switch component is connected to the charging and discharging current controller;
wherein, when the driver circuit switches the valve from the closed state to the open state, the discharging current being generated by discharging the second voltage that is outputted to the second side of the valve by the second driver flows to the external power source through the switch component being turned on.

8. The piezoelectric valve driver device according to claim 7, wherein the power charging circuit further includes a diode connected between the switch component and the external power source, an anode of the diode is connected to the second terminal of the switch component, and a cathode of the diode is connected to the external power source;
wherein, when the driver circuit switches the valve from the closed state to the open state, the discharging current being generated by discharging the second voltage that is outputted to the second side of the valve by the second driver flows sequentially through the switch component being turned on and the diode to the external power source.

9. The piezoelectric valve driver device according to claim 1, wherein, when the valve is in the open state, the first voltage that is outputted to the first side of the valve by the first driver is higher than the second voltage that is outputted to the second side of the valve by the second driver.

10. The piezoelectric valve driver device according to claim 1, wherein the first voltage of the first side of the valve in the open state is higher than the first voltage of the first side of the valve in the closed state.

11. The piezoelectric valve driver device according to claim 1, wherein the second voltage of the second side of the valve in the open state is lower than the second voltage of the second side of the valve in the closed state.

12. The piezoelectric valve driver device according to claim 1, wherein, when the valve is in the open state, the second voltage of the second side of the valve is equal to a zero value.

13. The piezoelectric valve driver device according to claim 1, wherein the second driver is coupled to the first voltage;
wherein, when the driver circuit switches the valve from the open state to the closed state, the first voltage that is outputted to the first side of the valve by the first driver is discharged to output a discharging current to the second driver, and then the second driver provides the second voltage to the second side of the valve by using the discharging current of the first voltage.

14. The piezoelectric valve driver device according to claim 1, wherein the second driver includes:
a first driving switch, wherein a first terminal of the first driving switch is coupled to the first voltage, and a control terminal of the first driving switch is connected to the charging and discharging current controller; and
a second driving switch, wherein a first terminal of the second driving switch is connected to a second terminal of the first driving switch, a node between the first terminal of the second driving switch and the second terminal of the first driving switch is connected to the second side of the valve, a second terminal of the second driving switch is coupled to a reference voltage, and a control terminal of the second driving switch is connected to the charging and discharging current controller;
wherein, when the driver circuit switches the valve from the closed state to the open state, the discharging current being generated by discharging the second voltage that is outputted to the second side of the valve by the second driver flows to a reference voltage level through the second driving switch being turned on, or flows to the external power source through the power charging circuit but not the second driving switch that is turned off.

15. The piezoelectric valve driver device according to claim 14, wherein, when the driver circuit switches the valve from the open state to the closed state, a discharging current being generated by discharging the first voltage that is outputted to the first side of the valve by the first driver flows to the second side of the valve through the first driving switch being turned on.

16. The piezoelectric valve driver device according to claim 15, wherein, when the valve is in the closed state, the first driving switch of the second driver is turned on such that the first voltage is equal to the second voltage, and a voltage modulator circuit included by the first driver adjusts each of the first voltage and the second voltage to be equal to a central voltage.

17. The piezoelectric valve driver device according to claim 1, wherein the charging and discharging current controller controls currents of the first driver, the second driver and the power charging device to control rising rates and falling rates of both of the first voltage and the second voltage, so as to control a switching rate of the valve.

* * * * *